United States Patent
Wyers

Patent Number: 5,215,232
Date of Patent: Jun. 1, 1993

[54] TIRE MOUNTED ARTICLE CARRIER ASSEMBLY

[76] Inventor: Philip W. Wyers, 6476 S. Ivy Ct., Engelwood, Colo. 80111

[21] Appl. No.: 738,572

[22] Filed: Jul. 31, 1991

[51] Int. Cl.$^5$ ............................................. B60R 9/10
[52] U.S. Cl. ............................ 224/42.13; 224/42.03 B
[58] Field of Search ............ 224/42.13, 42.12, 42.03 B

[56] References Cited

U.S. PATENT DOCUMENTS

| | | | |
|---|---|---|---|
| 3,658,201 | 4/1972 | Williams et al. | 224/42.13 |
| 3,877,622 | 4/1975 | McLain | 224/42.03 B |
| 3,972,457 | 8/1976 | Kesler | 224/42.13 |
| 4,299,341 | 11/1981 | Copeland et al. | 224/42.03 B |
| 4,392,597 | 7/1983 | Traugh | 224/42.13 |
| 4,884,728 | 12/1989 | Temple | 224/42.13 |
| 5,085,360 | 2/1992 | Fortune et al. | 224/42.13 |

Primary Examiner—Linda J. Sholl
Attorney, Agent, or Firm—Fields, Lewis, Pittenger & Rost

[57] ABSTRACT

An article carrier assembly suitable for detachably mounting articles to a vehicle such as bicycles, and the like articles. A rigid tubular frame structure is fastened to an externally mounted vehicle spare tire. The carrier frame assembly has a vertical telescoping portion that attaches to a horizontal upper support which has two outwardly extending tubular sections that are at right angles to the vertical telescoping portion. Also contained on the horizontal upper support are one or more outwardly extending support members which contact and support the article being carried. The tubular frame assembly is bound in place by cable or cord of sufficient length which passes through the lower portion of the vertical telescoping support and is wrapped around the backside of said vehicle spare tire and attached to the two horizontal tube sections which rest on the vehicle spare tire tread. The binding or clamping effect is created by way of a threaded bolt of sufficient length which goes into a complimentary nut affixed to the lower portion of the telescoping vertical section whereby when the tension bolt is turned in one direction shortens the telescoping vertical support and binds carrier to said vehicle spare tire.

11 Claims, 3 Drawing Sheets

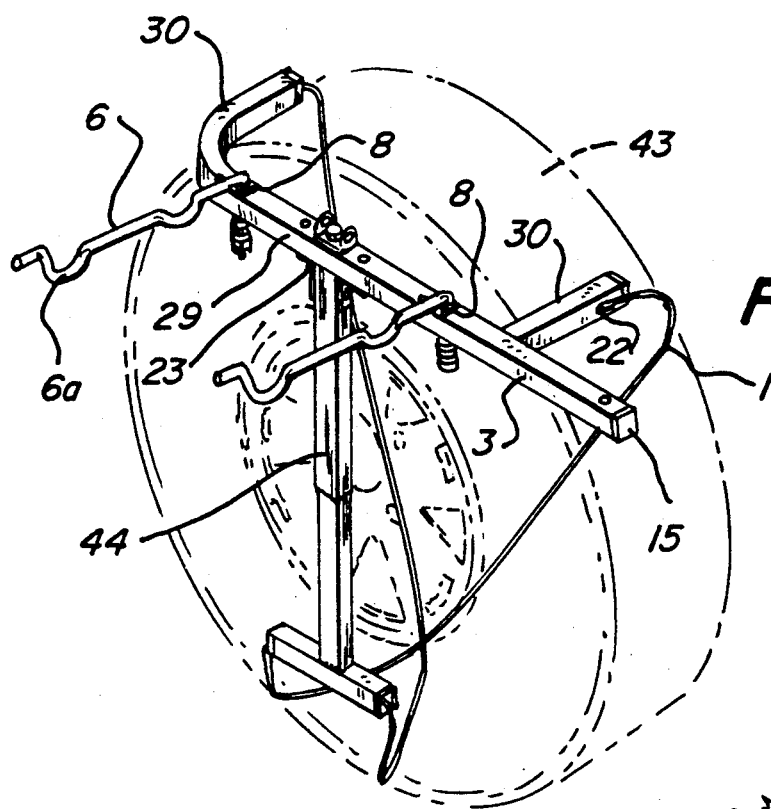
Fig_1
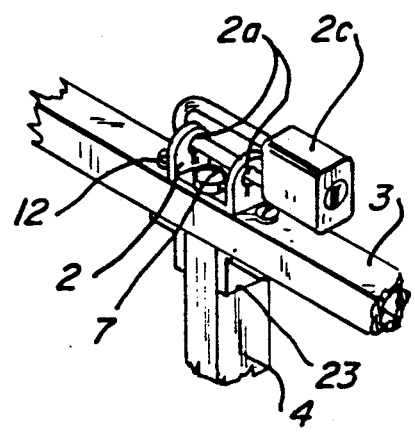
Fig_2
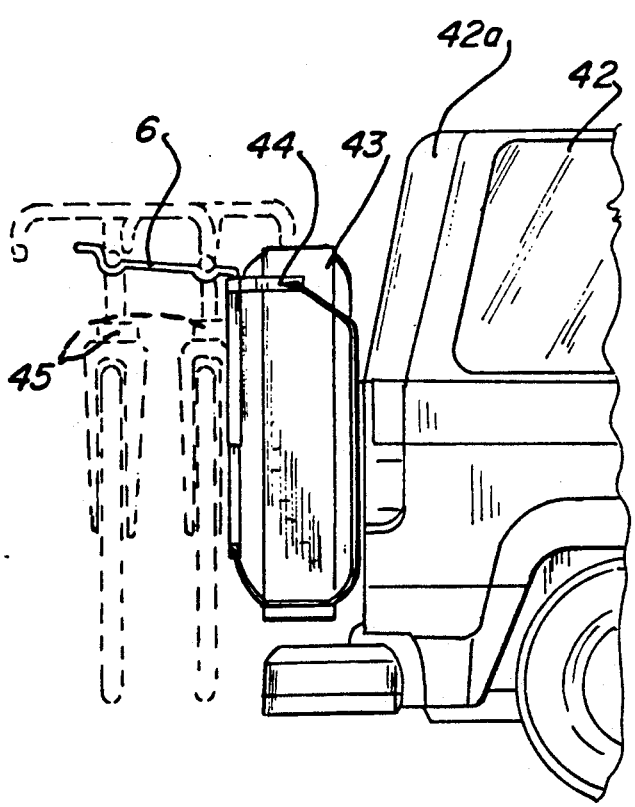
Fig_3

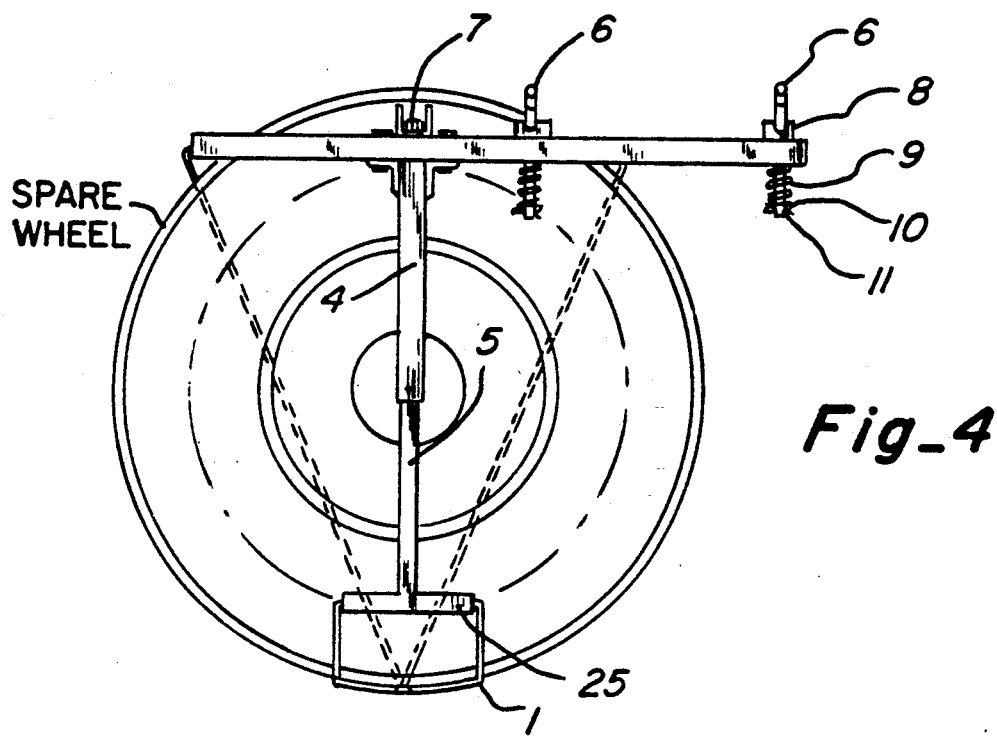
Fig_4
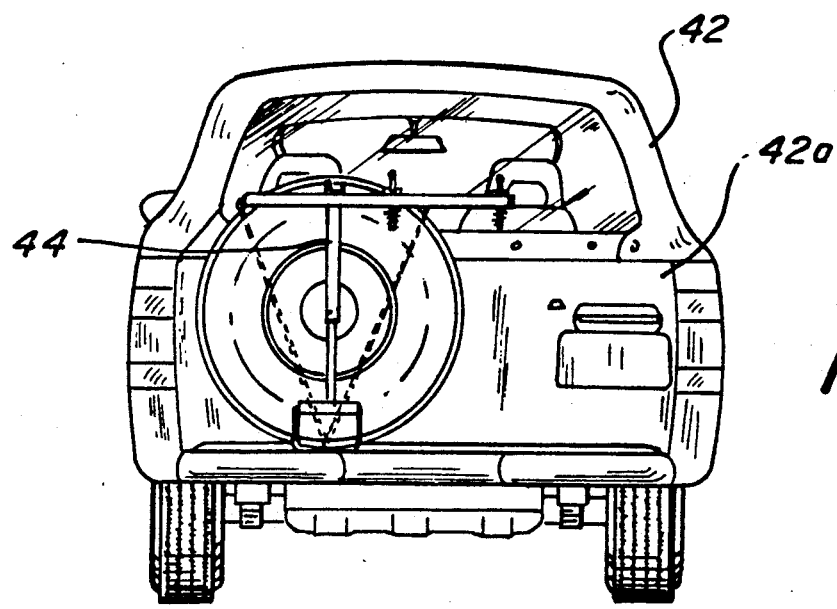
Fig_5

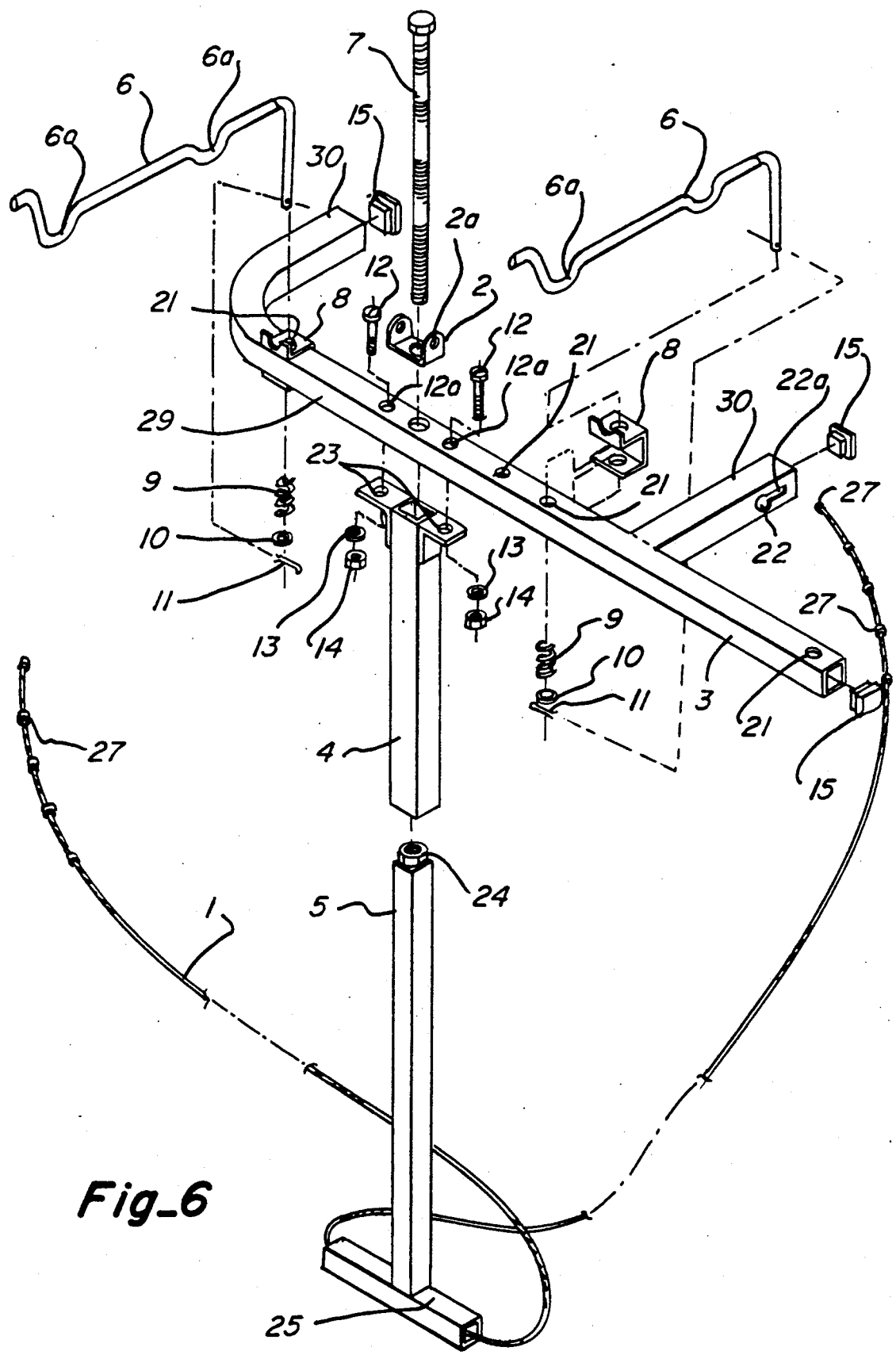
Fig_6 ic carriers, which are removably interconnected with bumpers of automobiles, trucks, are those devices illustrated and described in U.S. Pat. No. 4,299,341 issued to Copelind and U.S. Pat. No. 3,877,622 issued to McLain. These devices relate generally to carrier assemblies designed to affix to a standard trailer hitch assembly which would attach to the vehicle's existing frame structure.

TIRE MOUNTED ARTICLE CARRIER ASSEMBLY

TECHNICAL FIELD

This invention relates generally to carriers for transporting articles on a vehicle and is particularly suitable for bicycles or skis on a vehicle having generally a round, mounting surface such as that provided by a rear mounted spare tire as such found on utility vehicles and motor homes.

BACKGROUND ART

A variety of article carriers have heretofore been provided for mounting on vehicles, particularly at the front or rear of the vehicle to enable a variety of articles such as bicycles, motorcycles, skis and the like increasing the carrying capacity of the vehicle.

In general, there are a number of article carriers that have a number of mounting arms that bolt to a vehicle frame such as that disclosed in the U.S. Pat. No. 3,658,201.

Exemplary of prior art, bicycle carriers, which are removably interconnected with bumpers of automobiles, trucks, are those devices illustrated and described in U.S. Pat. No. 4,299,341 issued to Copelind and U.S. Pat. No. 3,877,622 issued to McLain. These devices relate generally to carrier assemblies designed to affix to a standard trailer hitch assembly which would attach to the vehicle's existing frame structure.

The article carrier of the present invention overcomes the drawbacks of prior art carrier devices by providing an apparatus which is highly stable and infinitely adjustable to all tire sizes while at the same time being rugged yet lightweight and can easily be interconnected with any exterior mounted vehicle spare tire whether it be a door mounted unit or a spare wheel mounted on a swing open gate type apparatus. The present invention is also quite versatile in carrying various articles such as bicycles, wheelchairs, and other velocipedes to be securely mounted thereon for safe transport. Additionally, the invention is asymmetrical in design with movable carrier arms to allow for its universal application to either right or left mounted exterior spare tires. The apparatus also embodies novel securement and locking means to prevent unauthorized removal of the article being carried from the article carrier as well as preventing unauthorized removal of the article carrier itself from the exterior mount vehicle spare tire carrier.

OBJECTS OF THE INVENTION

It is an object of the present invention to provide an article carrier assembly or rack which can be readily attached to any size standard automobile tire of the character frequently provided on vehicles such as passenger cars and trucks. It is another object of the invention to provide an article carrier of the character which can be securely locked to the spare tire so as to prevent unauthorized removal of carrier rack from the vehicle.

Another object of the invention is to provide an article carrier with the characters described which does not in any way interfere with the operation of the rear cargo doors or lid when article carrier is attached to the vehicle.

Still another object of the invention is to provide a carrier rack in the class described which is lightweight and durable and can be affixed to the vehicle without removing the exterior mounted spare tire of the vehicle or in any way utilizing existing hardware in place which may vary from vehicle to vehicle.

Another object of the invention is to provide an article carrier as described in the preceding paragraphs which the article to be carried can be securely supported on the carrier assembly and can be secured in place over a vinyl or metal spare tire cover which is often found on such vehicles with an exterior mounted spare tire.

Another object of the invention is to provide a carrier rack which is readily attachable to any type of motor home which may have an exterior mounted spare tire.

Still another object of the invention is to provide a carrier of the class described which is safe to use even under conditions of high vibration tending to loosen the carrier connection to the vehicle or to loosen the mechanism which secures the article to the article carrier.

Yet another object of the invention is to provide a carrier as described in the foregoing paragraphs which is adaptable to either carrying bicycles or wheelchairs or with the addition of the attachment unit carry up to four pairs of skis.

Still another object of the invention is to provide a carrier assembly whose articles supporting arms are adjustable so as to prevent objects being carried from hanging out on either side of the vehicle regardless of the whether the spare tire is mounted right, to the far left, or in the center on the back of the vehicle. The adjustability of the article support arms together with the asymmetrical design of the horizontal upper support is certain to accomplish these goals.

The foregoing along with other objects of the invention are achieved by an article carrier adapted to be detachably interconnected with a standard externally mounted spare tire often found on passenger vehicles as well as motor homes. Although the present invention has been described with a certain degree of particularity, it is understood that the present disclosure has been made by way of example and that changes in details of structure may be made without departing from the spirit thereof.

DISCLOSURE OF THE INVENTION

A rigid tubular frame assembly is tightly bound to an exterior mounted vehicle spare tire assembly preferably using pliable cable or cord. The single cable or cord has knots or oversized crimp rings allowing for adjustable lengths when slipped into opposing slotted keyholes on upper horizontal support of the carrier frame assembly. The lower vertical support portion of carrier frame assembly can be telescopically adjusted either upward or downward by way of a threaded bolt or other adjustable means which runs through a vertical aperture in the top of the upper horizontal support of the carrier frame assembly. By tightening the threaded bolt, it telescopically shortens the lower support arm which removes the slack in the cable or cord causing the carrier frame assembly to be rigidly bound to the vehicle spare tire. A locking bracket is located directly under the threaded bolt to allow for the use of a padlock to prevent access to the bolt head and deterring unauthorized removal of said carrier frame assembly and articles being carried.

BRIEF DESCRIPTION OF THE DRAWINGS

FIG. 1 is a top perspective view of an article carrier assembly embodying features of the present invention mounted on a spare tire shown in dashed lines which would be affixed to a motor vehicle.

FIG. 2 is a perspective view of a portion of FIG. 1 showing locking bracket feature and padlock on horizontal upper support.

FIG. 3 is a side elevation view of the article carrier assembly shown in FIG. 1 shown carrying two bicycles indicated in dashed lines.

FIG. 4 is a rear view of the article carrier assembly mounted on free floating spare wheel and shows how cable or cord wraps around the tire indicated in dash lines.

FIG. 5 is again a rear elevation view of carrier assembly shown mounted to the exterior mounted spare tire of a utility type vehicle. Drawing shows carrier arm positioning designed to compensate for either right or left rear mounted spare tires.

FIG. 6 is an exploded view of the assembly of FIG. 1.

DETAILED DESCRIPTION

Referring now to FIGS. 1, 3 and 6 of the drawing there is shown a motor vehicle 42 having a externally mounted spare tire 43 attached to the rear door of the vehicle 42a in a conventional manner. An article carrier assembly 44 according to the present invention is shown detachably mounted on the external spare tire 43. The spare tire has the conventional mounting system. Two bicycles 45 are shown mounted on the carrier assembly 44. While a externally mounted spare tire has been shown as providing a suitable mounting surface for the carrier assembly described herein, it is understood that other structure on a vehicle could be used to provide sufficient structural strength to support carrier assembly and load.

Referring to the drawings, and particularly to FIGS. 1 through 6, the article carrier of the present invention is there illustrated. The invention comprises a carrier assembly apparatus 44 as depicted in FIG. 1 which is bound to a vehicle rear mounted spare tire 43 by use of a flexible line means in the form of a cable or cord 1.

In the embodiment of the invention shown in FIGS. 1 through 6, the carrier assembly 44 comprises a generally circular clamping system made up of a generally horizontal upper support 3 which has an elongated longitudinal portion 29 and two lateral portions 30 which extend lateral and perpendicular to the longitudinal portion 29 at a predetermined distance not wider than the circumference of standard vehicle passenger tires. The longitudinal portion 29 and lateral portion 30 are configured to resemble a letter F which lies horizontally flat on the tire tread.

The horizontal upper support 3 further has been drilled with a number of apertures 21 for the placement of at least one outwardly extending article supporting element 6 for removably supporting the article to be carried as seen in FIG. 4. These support arms 6 are adjustable to numerous positions along the horizontal upper support 3 to adjust for vehicle spare tire location. Horizontal upper support 3 has located in its two lateral perpendicular portion 30, two key slotted holes 22 for use in adjusting the line securing means in the form of a cable or cord 1 to compliment tire size. Horizontal support 3 has all ends sealed with plastic caps 15.

Attached at a right angle at the mid point between the perpendicular lateral tubes 30 of horizontal support 3 is the upper vertical support 4 as depicted in FIG. 6 which is attached to horizontal upper support 3 by standard metal fasteners 12 and in washer 13 and lock nut 14.

Upper vertical support 4 has affixed to it by means of welding two L-shaped brackets 23 with complimentary apertures for attachment to horizontal upper support 3 with fasteners 12. Upper vertical support 4 is telescopically receivable with lower vertical support 5 which is made adjustable and held in place through horizontal upper support 3 by threaded fastener 7 which is inserted through a vertical aperture 7a which then mates with lower vertical support 5 by means of a complimentary threaded nut 24 welded to the top of said lower vertical support 5. The opposite end or bottom of said lower vertical support 5 has affixed to it by means of welding at right angle and centered a hollow transverse bottom crossmember 25 to allow for line means 1 to pass through and be adjusted to equal lengths.

Forming an important part of present invention is securement means which is provided by a bracket assemblage 2 to which when a padlock 2c is inserted through complimentary apertures 2a of said bracket as best seen in FIG. 2 which prevents unauthorized access to tension bolt 7 as depicted in FIG. 2. Referring now to FIG. 6 and FIG. 5 of the drawings, the outwardly extending support arms 6 can be readily moved to the various aperture locations 21 for adjustment in keeping articles to be carried centered behind said vehicle. It should be noted that position brackets 8 are designed to be interchangeably relocated with said supporting arms 6. Supporting arms 6 are held in place under spring tension provided by springs 9 held in place by flat washer 10 and by a securement pin 11. Article support rods 6 have concave indentures 6a to receive a frame member such as crossbar of bicycle 45.

Forming another important part of the invention are the movable brackets 8 which can be moved to any aperture location 21 to provide for article support elements 6 to keep them from moving out of position. In referring to FIG. 6 it is important to note that great adjustability and versatility is added to the article carrier assembly by virtue of the oversized crimp rings 27 on line means 1 which effectively reduce the length of the line means 1 when slipped through and adjusted into the slotted key holes 22 on outward sides of the lateral portion 30 of horizontal upper support 3 as depicted in FIG. 6. The oversized crimp rings 27 slip through the larger circular portion of said key hole 22. When line means 1 is tightened by turning threaded bolt 7, crimp rings 27 slide into narrow portion 22a to prevent movement of line means 1. In referring to FIG. 1 and FIG. 3 attachment of the carrier assembly 44 to externally mounted spare tire 43 requires only that the carrier assembly be set on tire as shown in FIG. 1 and loosening tension bolt 7 as to lower the lower vertical support so that it is flush with the bottom portion of said spare tire 43 and then feeding line means 1 through hollow portion of bottom cross member 25 leaving equal lengths on each side and crossing it at the bottom of said spare tire 43 and feeding it up behind said spare tire 43 to the outer slotted key holes 22 on lateral portion 30 of horizontal upper support 3 and feeding in the crimp rings 27 into the slotted key holes 22 to shorten the line means 1. Final clamping of the carrier 44 is achieved by tightening threaded tension bolt 7 with vehicle tire tool in a clockwise fashion which telescopically shortens the lower vertical support 5 thus creating a binding effect by the carrier assembly 44 and line means 1 which securely affixes the carrier 44 to the spare tire 43. The carrier 44 can now be locked by using any form of shank type locking mechanism 2c in conjunction with bracket assemblage as depicted in FIG. 2 thus eliminating access to said tension bolt 7.

The article carrier assembly of the present invention has distinct advantages over known prior art in that it may be easily and quickly mounted to virtually any size externally mounted spare tire from the smallest to the largest sizes. The fact that the carrier can be mounted externally over the outside of the tire provides a significant advantage over prior known carrier mounts which rely on mounting to the hub wheel portion by use of nuts and bolts whose patterns and fastener devices vary greatly from manufacturer to manufacturer. The article carrier assembly of the present invention can even mount over vinyl or metal spare tire covers found on most utility vehicles regardless of whether it is a door mount system or swing open gate style spare tire carrier unit. The only requirement for the attachment of said article carrier assembly is that the mounting surface be of the approximate volume and shape of that of a standard passenger automobile tire.

The circular pressure point clamping system provides distinct mechanical advantage over that of known prior art in preventing the carrier from twisting to either side.

Another distinct and unique feature of the article carrier assembly of the present invention is its asymmetrical design of the horizontal upper support which greatly enhances its versatility in being able to be adapted to either a right or left mount external spare tire which is equally applicable to the various makes of automobiles.

Still another distinct advantage over known prior art for said article carrier is its spring loaded folding outwardly extending article support elements 6 which when the bicycle carrier is not in use can be folded inward and a ski rack attachment can be clipped onto the carrier frame assembly for the transporting of up to four pairs of skis.

What is claimed is:

1. An article carrier assembly adapted for detachably mounting to a spare tire on a vehicle, said assembly comprising:
   (a) a rigid frame including a generally horizontal upper support including a longitudinal portion for extending along the face of a spare tire and a pair of spaced lateral portions extending perpendicularly and outwardly from said longitudinal portion and at a selected distance apart to rest externally on the peripheral surface of a spare tire and a generally vertical lower support extending down from an intermediate portion of said upper support, said lower support being made of two telescoping members to provide a length adjustment for said lower support;
   (b) line means entering through a lower end portion of said lower support and behind said tire and attached to said upper support to provide a continuous loop around said spare tire;
   (c) fastening means associated with said lower support operable to change the length of said two telescoping members whereby shortening the length of said telescoping members removes slack in said line means to firmly secure the frame to said tire and lengthening said telescoping members puts slack in said line means to release said frame from said tire; and
   (d) at least one outwardly extending article support element carried by said horizontal upper support for supporting the article to be carried.

2. An article carrier assembly as set forth in claim 1 wherein said longitudinal portion and lateral portions are configured to resemble a letter F lying horizontally flat across the upper portion of a spare tire tread.

3. An article carrier assembly as set forth in claim 1 wherein said horizontal upper support contains a series of apertures for placement of said article support element in selected of multiple locations along said upper support.

4. An article carrier assembly as set forth in claim 1 wherein said fastening means includes a removable threaded fastener and further including a U shaped bracket for use with a removable locking device which limits access to said removable threaded fastener to prevent unauthorized removal of the article carrier assembly from the tire.

5. An article carrier assembly as set forth in claim 1 wherein said lower support includes an upper vertical female tube attached to said horizontal upper support.

6. An article carrier assembly as set forth in claim 5 wherein said lower support includes a lower vertical support male tube telescopically fitting into said upper vertical female tube.

7. An article carrier assembly as set forth in claim 6 wherein said male tube has affixed to its uppermost end a female threaded nut.

8. An article carrier assembly as set forth in claim 7 wherein said male tube is telescopically held to said female tube and said horizontal upper support by means of a complimentary threaded bolt that extends through said horizontal upper support and said male and female tubes and into said nut.

9. An article carrier assembly as set forth in claim 1 wherein said article support element is adapted to carry at least one bicycle.

10. An article carrier assembly as set forth in claim 1 wherein said lower support has affixed to the bottom a hollow tube centered with respect to said lower vertical support and extending at a right angle to said lower support.

11. An article carrier assembly as set forth in claim 1 wherein said line means has a plurality of spaced oversized crimp rings positioned at predetermined distances at each end of said line means whereby said line means extends through an aperture at the bottom end of said lower vertical support and is brought behind the spare tire to complete an uninterrupted circle around the tire.

* * * * *